US012425252B2

United States Patent
Törnkvist et al.

(10) Patent No.: US 12,425,252 B2
(45) Date of Patent: Sep. 23, 2025

(54) EVENT-BASED REPORTING FROM A NETWORK FUNCTION IN A SERVICE BASED ARCHITECTURE NETWORK

(71) Applicant: Telefonaktiebolaget LM Ericsson (publ), Stockholm (SE)

(72) Inventors: Robert Törnkvist, Karlskrona (SE); Karthikeyan Chandrasekar, Chennai (IN); Jayakrishnan Kizhakke Pullarappillil, Cochin (IN); Arvindh Rajesh Tamilmani, Chennai (IN); Natarajan Thekkan, Dindigul (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 18/031,661

(22) PCT Filed: Oct. 14, 2020

(86) PCT No.: PCT/EP2020/078955
§ 371 (c)(1),
(2) Date: Apr. 13, 2023

(87) PCT Pub. No.: WO2022/078596
PCT Pub. Date: Apr. 21, 2022

(65) Prior Publication Data
US 2023/0412408 A1 Dec. 21, 2023

(51) Int. Cl.
*H04L 12/14* (2006.01)
*H04W 4/24* (2018.01)

(52) U.S. Cl.
CPC ........... *H04L 12/1407* (2013.01); *H04W 4/24* (2013.01)

(58) Field of Classification Search
CPC .............................. H04L 12/1407; H04W 4/24
See application file for complete search history.

(56) References Cited

U.S. PATENT DOCUMENTS 11,310,731 B1 * 4/2022 Feder ...................... H04W 8/08
2020/0053638 A1 * 2/2020 Edge .................. H04W 64/003
(Continued)

FOREIGN PATENT DOCUMENTS

| WO | 2020/052789 A1 | 3/2020 |
| WO | 2020/200695 A1 | 10/2020 |

OTHER PUBLICATIONS

International Search Report and Written Opinion dated Jul. 7, 2021 issued in International Patent Application No. PCT/EP2020/078955 (23 pages).
(Continued)

*Primary Examiner* — Ricky Q Ngo
(74) *Attorney, Agent, or Firm* — Sage Patent Group

(57) ABSTRACT

There is provided mechanisms for event-based reporting from a second NF to a first NF in an SBA network. A method is performed by the first NF. The method comprises sending reporting instructions of events for a session with the second NF. The reporting instructions comprise a list of triggers conditions for each of the events and information of IEs whose values are cached by the first NF for the session. Each of the trigger conditions is associated with its own set of IEs. The second NF is instructed to provide a report to the first NF when one of the trigger conditions is fulfilled at the second NF. The report comprises values of the set of IEs for the event that caused the trigger condition to be fulfilled. The second NF is instructed to include values in the report of those IEs cached by the first NF only if the values have changed compared to the cached values. The method comprises receiving, on an interface between the first NF and the second NF, the report of the event upon the trigger conditions having been fulfilled at the second NF.

20 Claims, 7 Drawing Sheets

(56) References Cited

U.S. PATENT DOCUMENTS

| | | |
|---|---|---|
| 2020/0396657 A1* | 12/2020 | Feder ................ H04W 36/0061 |
| 2022/0116811 A1* | 4/2022 | Li ......................... H04W 24/10 |
| 2023/0156579 A1* | 5/2023 | Thiebaut ............... H04W 48/16 |
| | | 370/329 |
| 2023/0345244 A1* | 10/2023 | Kim ...................... H04W 12/06 |
| 2023/0345297 A1* | 10/2023 | Karampatsis ......... H04L 41/342 |

OTHER PUBLICATIONS

3GPP TS 23.502 V15.2.0, June 2018-06, Technical Specification, 3rd Generation Partnership Project; Technical Specification Group Services and System Aspects; Procedures for the 5G System; Stage 2 (Release 15) (308 pages).

* cited by examiner

EVENT-BASED REPORTING FROM A NETWORK FUNCTION IN A SERVICE BASED ARCHITECTURE NETWORK

CROSS REFERENCE TO RELATED APPLICATIONS

This application is a 35 U.S.C. § 371 National Stage of International Patent Application No. PCT/EP2020/078955, filed Oct. 14, 2020.

TECHNICAL FIELD

Embodiments presented herein relate to methods, a first Network Function a second Network Function, computer programs, and a computer program product for event-based reporting from the second Network Function to the first Network Function in a Service Based Architecture network.

BACKGROUND

The Core Network (CN) of the fifth generation (5G) telecommunication network comprises functional entities called Network Functions (NFs). System functionality is achieved by a set of NFs providing services to other authorized NFs to access their services. Each NF offers different functionalities and thereby provides different services. An NF service is one type of capability exposed by a NF service producer to other authorized NF service consumers, through a service-based interface (SBI). An NF service may support one or more NF service operation(s). In the 5G System Architecture the NFs communicate over a Service Based Architecture (SBA) network.

As a non-limiting illustrative example, in the 5G System Architecture is defined Converged Charging and Spending Limit Control services provided over an interface Nchf. This interface is used for communication between an NF in the form of a Session Management Functions (SMF) or Policy Control Function (PCF) and an NF in the form of a Charging Function (CHF).

The following services are defined for the interface Nchf: Nchf_ConvergedCharging service, Nchf_OfflineOnly-Charging service, Nchf_SpendingLimitControl. As an example, the Nchf_ConvergedCharging service consists of Create, Update, Release and Notify requests.

In these requests there are multiple information elements (IEs) exchanged to handle different parameters such as user equipment location, NF details, uplink/downlink data usage, network event triggers, Packet Data Unit-type/SessionId, etc. These parameters are exchanged over HTTP/2.

Continuing the examples of the charging interface, a charging session is established when the SMF sends Nchf_ConvergedCharging_Create operation message to the CHF. Once the session is established, then there could be many Nchf_ConvergedCharging_Update operations exchanged between the SMF and the CHF. Finally, the session is terminated when an Nchf_ConvergedCharging_Release operation is exchanged between the SMF and the CHF. There might be many IEs exchanged between the SMF and the CHF over the interface Nchf. The IEs that are exchanged between the SMF and the CHF can be classified as mandatory and optional.

Some of the IEs that are exchanged between the SMF and the CHF will be repeated in Nchf operations that are exchanged for a session, i.e. an IE that is part of Nchf_ConvergedCharging_Create will be sent in further Nchf_ConvergedCharging_Update and Nchf_ConvergedCharging_Release operations between the SMF and the CHF. In a session there will be multiple of Nchf_ConvergedCharging_update operations until the session is terminated via the Nchf_ConvergedCharging_Release operation.

Some of the IEs are not expected to change values between an Nchf_ConvergedCharging_Create operation and a subsequent Nchf_ConvergedCharging_Update or Nchf_ConvergedCharging_Release operations. Some of the IEs can be optional in the Nchf_ConvergedCharging_Update or Nchf_ConvergedCharging_Release operations and in their absence, the CHF can use cached values of these IEs from previous operations for the same session.

These optional IEs, even though can be avoided from a user perspective (i.e. the CHF can send them only if the value changes compared to previous service operation) in subsequent Nchf operations in a session, the IE values are still sent between the SMF and CHF in all the Nchf_ConvergedCharging_Update and Nchf_ConvergedCharging_Release operations for the session. This results in increased message size.

The NFs might thus build messages with all the data and transmitting the data with big payload size over a transport channel. Similarly, the NF receiving the message must be capable of processing large-sized message and, from the message, extract and select needed data appropriate to the functionality. Hence, the message exchange result in overhead.

Moreover, the operator network might need to be expanded to handle more interactions over the different interfaces in the SBA network since mobile broadband usage is expected to grow and because new NFs might be introduced. If the message size grows, this places additional demands on the network infrastructure. Failure to expand the network infrastructure might impact the performance for the end-users.

In view of the above, there is still a need for more resource efficient signalling over the interfaces in the SBA network.

SUMMARY

An object of embodiments herein is to enable efficient signalling over the interfaces in the SBA network such that the above issues are avoided, or at least mitigated or reduced.

According to a first aspect there is presented a method for event-based reporting from a second NF to a first NF in an SBA network. The method is performed by the first NF. The method comprises sending reporting instructions of events for a session with the second NF. The reporting instructions comprise a list of triggers conditions for each of the events and information of IEs whose values are cached by the first NF for the session. Each of the trigger conditions is associated with its own set of IEs. The second NF is instructed to provide a report to the first NF when one of the trigger conditions is fulfilled at the second NF. The report comprises values of the set of IEs for the event that caused the trigger condition to be fulfilled. The second NF is instructed to include values in the report of those IEs cached by the first NF only if the values have changed compared to the cached values. The method comprises receiving, on an interface between the first NF and the second NF, the report of the event upon the trigger conditions having been fulfilled at the second NF.

According to a second aspect there is presented a first NF for event-based reporting from a second NF to the first NF in an SBA network. The first NF comprises processing circuitry. The processing circuitry is configured to cause the first NF to send reporting instructions of events for a session with the second NF. The reporting instructions comprise a list of triggers conditions for each of the events and information of IEs whose values are cached by the first NF for the session. Each of the trigger conditions is associated with its own set of IEs. The second NF is instructed to provide a report to the first NF when one of the trigger conditions is fulfilled at the second NF. The report comprises values of the set of IEs for the event that caused the trigger condition to be fulfilled. The second NF is instructed to include values in the report of those IEs cached by the first NF only if the values have changed compared to the cached values. The processing circuitry is configured to cause the first NF to receive, on an interface between the first NF and the second NF, the report of the event upon the trigger conditions having been fulfilled at the second NF.

According to a third aspect there is presented a first NF for event-based reporting from a second NF to the first NF in an SBA network. The first NF comprises a send module configured to send reporting instructions of events for a session with the second NF. The reporting instructions comprise a list of triggers conditions for each of the events and information of IEs whose values are cached by the first NF for the session. Each of the trigger conditions is associated with its own set of IEs. The second NF is instructed to provide a report to the first NF when one of the trigger conditions is fulfilled at the second NF. The report comprises values of the set of IEs for the event that caused the trigger condition to be fulfilled. The second NF is instructed to include values in the report of those IEs cached by the first NF only if the values have changed compared to the cached values. The first NF comprises a receive module configured to receive, on an interface between the first NF and the second NF, the report of the event upon the trigger conditions having been fulfilled at the second NF.

According to a fourth aspect there is presented a computer program for event-based reporting from a second NF to a first NF in an SBA network. The computer program comprises computer program code which, when run on processing circuitry of a first NF, causes the first NF to perform a method according to the first aspect.

According to a fifth aspect there is presented method for event-based reporting from a second NF to a first NF in an SBA network. The method is performed by the second NF. The method comprises obtaining reporting instructions of events for a session with the first NF. The reporting instructions comprise a list of triggers conditions for each of the events and information of IEs whose values are cached by the first NF for the session. Each of the trigger conditions is associated with its own set of IEs. The second NF is instructed to provide a report to the first NF when one of the trigger conditions is fulfilled at the second NF. The report comprises values of the set of IEs for the event that caused the trigger condition to be fulfilled. The second NF is instructed to include values in the report of those IEs cached by the first NF only if the values have changed compared to the cached values. The method comprises detecting occurrence of one of the events which causes at least one of the trigger conditions to be fulfilled at the second NF. The method comprises, as a result thereof, providing, on an interface between the second NF and the first NF, the report of the detected event in accordance with the reporting instructions.

According to a sixth aspect there is presented a second NF for event-based reporting from the second NF to a first NF in an SBA network. The second NF comprises processing circuitry. The processing circuitry is configured to cause the second NF to obtain reporting instructions of events for a session with the first NF. The reporting instructions comprise a list of triggers conditions for each of the events and information of IEs whose values are cached by the first NF for the session. Each of the trigger conditions is associated with its own set of IEs. The second NF is instructed to provide a report to the first NF when one of the trigger conditions is fulfilled at the second NF. The report comprises values of the set of IEs for the event that caused the trigger condition to be fulfilled. The second NF is instructed to include values in the report of those IEs cached by the first NF only if the values have changed compared to the cached values. The processing circuitry is configured to cause the second NF to detect occurrence of one of the events which causes at least one of the trigger conditions to be fulfilled at the second NF. The processing circuitry is configured to cause the second NF to, as a result thereof, provide, on an interface between the second NF and the first NF. The report of the detected event in accordance with the reporting instructions.

According to a seventh aspect there is presented a second NF for event-based reporting from the second NF to a first NF in an SBA network. The second NF comprises an obtain module configured to obtain reporting instructions of events for a session with the first NF. The reporting instructions comprise a list of triggers conditions for each of the events and information of IEs whose values are cached by the first NF for the session. Each of the trigger conditions is associated with its own set of IEs. The second NF is instructed to provide a report to the first NF when one of the trigger conditions is fulfilled at the second NF. The report comprises values of the set of IEs for the event that caused the trigger condition to be fulfilled. The second NF is instructed to include values in the report of those IEs cached by the first NF only if the values have changed compared to the cached values. The second NF comprises a detect module configured to detect occurrence of one of the events which causes at least one of the trigger conditions to be fulfilled at the second NF. The second NF comprises a provide module configured to, as a result thereof, provide, on an interface between the second NF and the first NF. The report of the detected event in accordance with the reporting instructions.

According to an eighth aspect there is presented a computer program for event-based reporting from a second NF to a first NF in an SBA network, the computer program comprising computer program code which, when run on processing circuitry of a second NF, causes the second NF to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously these methods, these NFs, these computer programs, and this computer program product, enable efficient signalling over the interfaces in the SBA network.

Advantageously these methods, these NFs, these computer programs, and this computer program product, enable a reduction of the overhead in the signalling between the first NF and the second NF. In turn, this lowers the requirement of the bandwidth of the control plane transport channel.

Advantageously these methods, these NFs, these computer programs, and this computer program product, enable a reduction of the message size of the reports prepared and sent by the second NF to the first NF, thus increasing the performance for both the sending NF (i.e., the second NF) and the receiving NF (i.e., the first NF).

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise.

The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
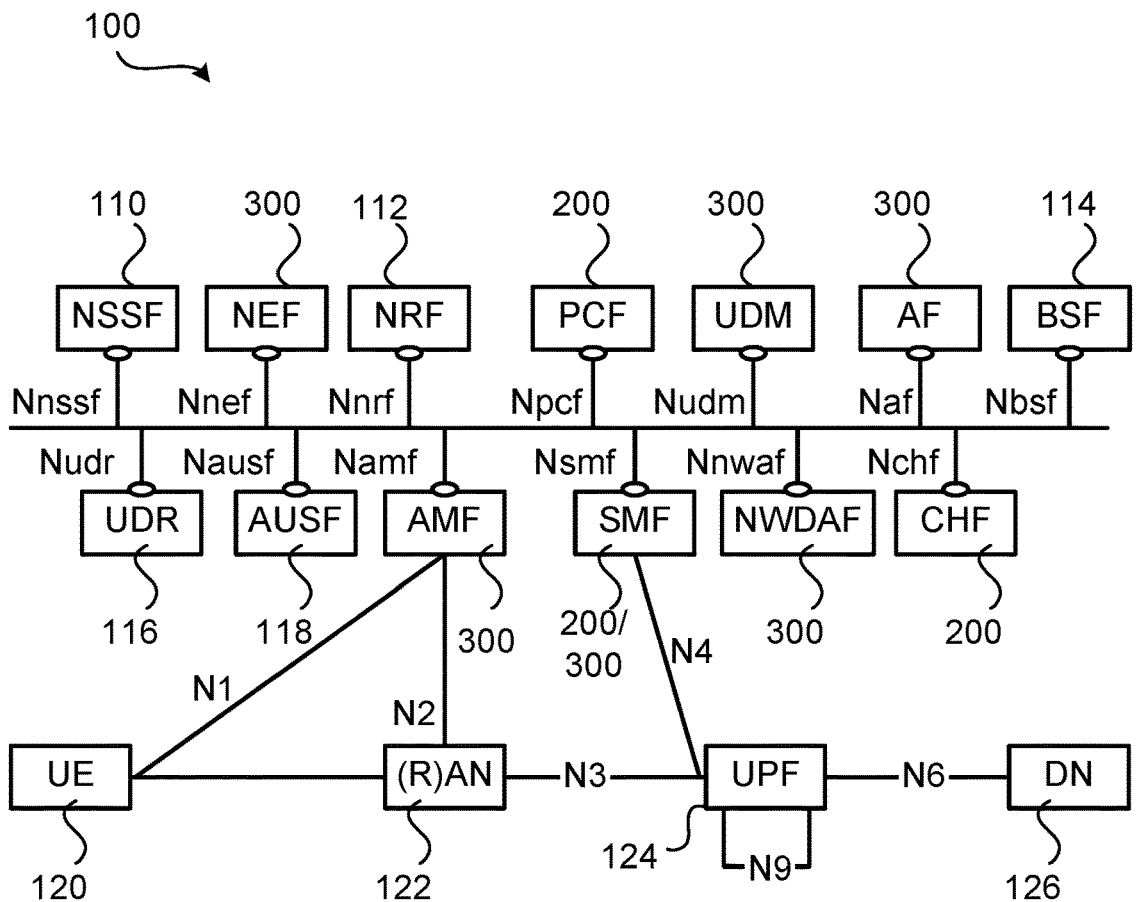
FIG. 1 is a schematic diagram illustrating an SBA network according to embodiments.

FIG. 1 is a schematic diagram illustrating an SBA network 100 where embodiments presented herein can be applied. The SBA network 100 represents a reference architecture of a 5G telecommunication system (5GS) and comprises the following entities: and Authentication Server Function (AUSF), an Access and Mobility Management Function (AMF), a Data Network (DN), e.g. operator services, Internet access or 3rd party services, a Network Exposure Function (NEF), a Network Repository Function (NRF), a Network Slice Selection Function (NSSF), a Policy Control Function (PCF), a Session Management Function (SMF), a Unified Data Management (UDM) function, a Unified Data Repository (UDR), a User Plane Function (UPF), an Application Function (AF), a User Equipment (UE), a (Radio) Access Network ((R)AN), a Network Data Analytics Function (NWDAF), a Binding Support Function (BSF), and a Charging Function (CHF). Service based interfaces are represented by the format Nxyz (e.g., Nnssf, Nnef, etc.) and point to point interfaces are represented by the format Nx (e.g. N1, N2, etc.). The NSSF, NEF, NRF, PCF, UDM, AF, BSF, UDR, AUSF, AMF, SMF, NWDAF, and CHF are all examples of possible NF producers and possible NF consumers.

As disclosed above there is still a need for more resource efficient signalling over the interfaces in the SBA network 100.

The embodiments disclosed herein in particular relate to mechanisms for event-based reporting from a second NF 300 to a first NF 200 in an SBA network 100. In order to obtain such mechanisms there is provided a first NF 200, a method performed by the first NF 200, a computer program product comprising code, for example in the form of a computer program, that when run on processing circuitry of the first NF 200, causes the first NF 200 to perform the method. In order to obtain such mechanisms there is further provided a second NF 300, a method performed by the second NF 300, and a computer program product comprising code, for example in the form of a computer program, that when run on processing circuitry of the second NF 300, causes the second NF 300 to perform the method.

Figure 2:
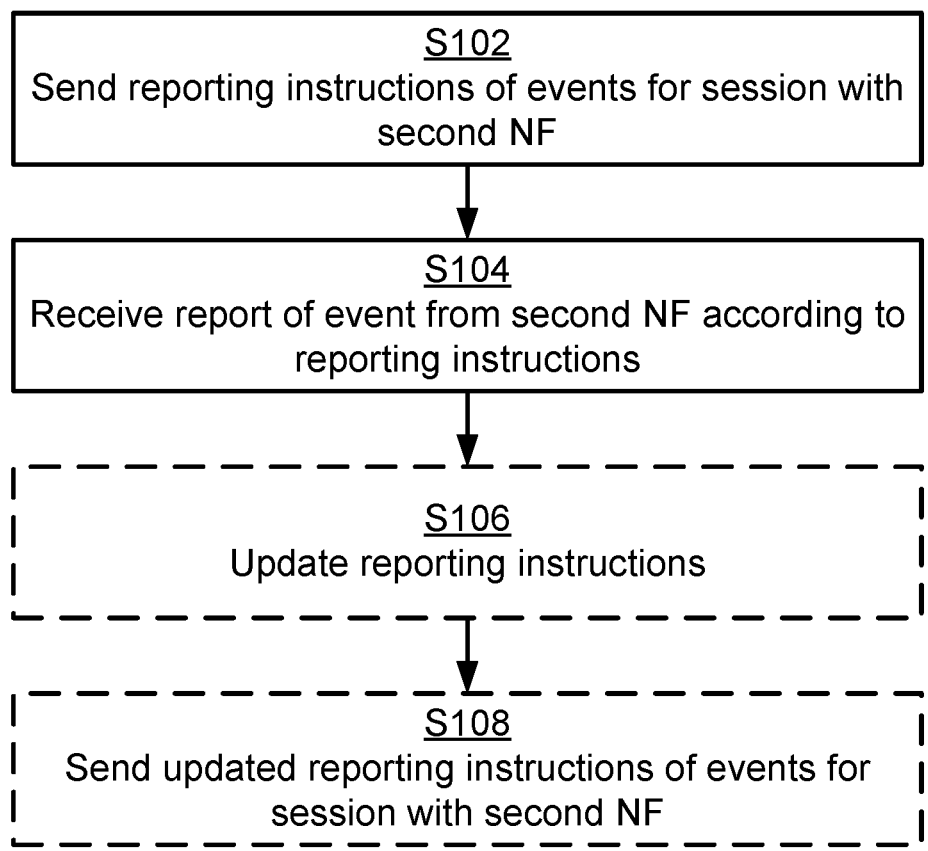
FIGS. 2, 3 and 6 are flowcharts of methods according to embodiments.

Reference is now made to FIG. 2 illustrating a method for event-based reporting from a second NF 300 to a first NF 200 in an SBA network 100 as performed by the first NF 200 according to an embodiment.

S102: The first NF 200 sends reporting instructions of events for a session with the second NF 300. The reporting instructions comprise a list of triggers conditions for each of the events and information of IEs whose values are cached by the first NF 200 for the session. Each of the trigger conditions is associated with its own set of IEs. The second NF 300 is instructed to provide a report to the first NF 200 when one of the trigger conditions is fulfilled at the second NF 300. The report comprises values of the set of IEs for the event that caused the trigger condition to be fulfilled. The second NF 300 is instructed to include in the report values of those IEs cached by the first NF 200 only if the values have changed compared to the cached values.

S104: The first NF 200 receives, on an interface between the first NF 200 and the second NF 300, the report of the event upon the trigger conditions having been fulfilled at the second NF 300.

Embodiments relating to further details of event-based reporting from a second NF 300 to a first NF 200 in an SBA network 100 as performed by the first NF 200 will now be disclosed.

Further aspects of the content of the reporting instructions will be provided next. In some aspects, the reporting instructions comprise values of the cached IEs. That is, in some embodiments, the reporting instructions comprises the cached values of the IEs whose values are cached by the first NF 200 for the session. In some aspects, other IEs than the trigger associated IEs are also cached by the first NF 200. That is, in some embodiments, some of the IEs whose values are cached by the first NF 200 for the session are not associated with any of the trigger conditions.

Further aspects of the delivery of the reporting instructions, that is how the reporting instructions might be sent in step S102, will be provided next. In some aspects, the reporting instructions are sent as metadata during initial message interaction of the session. That is, in some embodiments, the reporting instructions are sent to the second NF 300 during initial message exchange of the session with the second NF 300. In some aspects, the reporting instructions are sent as metadata when event triggers are updated during the session. That is, in some embodiments, the reporting instructions are sent to the second NF 300 during the session upon any of the trigger conditions having been updated during the session. In other aspects the reporting instructions are published using a Uniform Resource Locator (URL). In particular, in some embodiments, the reporting instructions are published as a web resource, and wherein the reporting instructions are sent as a URL pointing to the web resource. The URL might be provided in a Hypertext Transfer Protocol (HTTP) header.

In some aspects, the first NF 200, upon having received the report in step S104 from the second NF 300, responds back to the second NF 300 with updated reporting instructions. That is, in some embodiments, the first NF 200 is configured to perform (optional) steps S106 and S108:

S106: The first NF 200 updates the reporting instructions upon having received the report.

S108: The first NF 200 sends the reporting instructions as updated for the session with the second NF 300.

The reporting instructions as updated might be sent in the same way as the reporting instructions are sent in step S102.

There could be different ways for the first NF 200 to update the reporting instructions in step S106. In some embodiments, the reporting instructions are updated based on for which event the trigger condition was fulfilled and which values were received in the report from the second NF 300.

Figure 3:
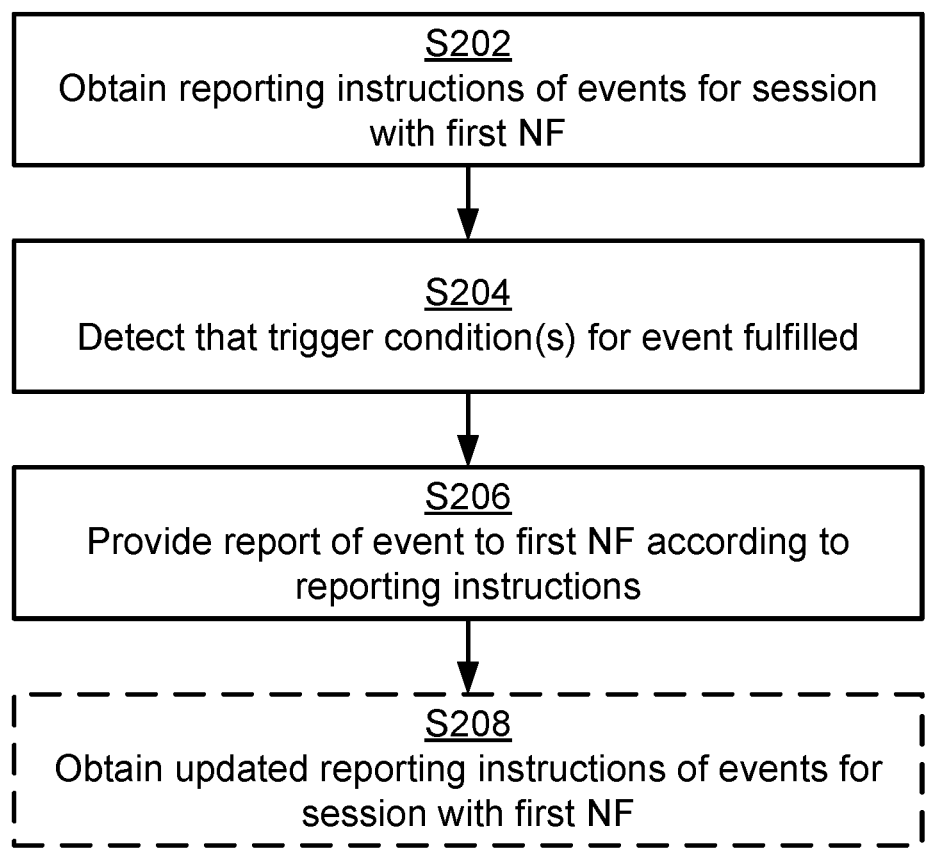

Reference is now made to FIG. 3 illustrating a method for event-based reporting from a second NF 300 to a first NF 200 in an SBA network 100 as performed by the second NF 300 according to an embodiment.

S202: The second NF 300 obtains reporting instructions of events for a session with the first NF 200. The reporting instructions comprise a list of triggers conditions for each of the events and information of IEs whose values are cached by the first NF 200 for the session. Each of the trigger conditions is associated with its own set of IEs. The second NF 300 is instructed to provide a report to the first NF 200 when one of the trigger conditions is fulfilled at the second NF 300. The report comprises values of the set of IEs for the event that caused the trigger condition to be fulfilled. The second NF 300 is instructed to include in the report values of those IEs cached by the first NF 200 only if the values have changed compared to the cached values.

S204: The second NF 300 detects occurrence of one of the events which causes at least one of the trigger conditions to be fulfilled at the second NF 300.

S206: The second NF 300, as a result thereof, provides, on an interface between the second NF 300 and the first NF 200, the report of the detected event in accordance with the reporting instructions.

Embodiments relating to further details of event-based reporting from a second NF 300 to a first NF 200 in an SBA network 100 as performed by the second NF 300 will now be disclosed.

Further aspects of the content of the reporting instructions will be provided next. As disclosed above, in some aspects, the reporting instructions comprise values of the cached IEs. That is, in some embodiments, the reporting instructions comprises the cached values of the IEs whose values are cached by the first NF 200 for the session. As disclosed above, in some aspects, other IEs than the trigger associated IEs are also cached by the first NF 200. That is, in some embodiments, some of the IEs whose values are cached by the first NF 200 for the session are not associated with any of the trigger conditions.

Further aspects of the delivery of the reporting instructions, that is how the reporting instructions might be obtained in step S202, will be provided next. As disclosed above, in some aspects, the reporting instructions are sent as metadata during initial message interaction of the session. That is, in some embodiments, the reporting instructions are obtained from the first NF 200 during initial message exchange of the session with the first NF 200. As disclosed above, in some aspects, the reporting instructions are sent as metadata when event triggers are updated during the session. That is, in some embodiments, the reporting instructions are obtained from the first NF 200 during the session upon any of the trigger conditions having been updated during the session. As disclosed above, in other aspects the reporting instructions are published using a URL. In particular, in some embodiments, the reporting instructions are published as a web resource, and the reporting instructions are obtained as a URL pointing to the web resource. The URL might be provided in a HTTP header.

As disclosed above, in some aspects, the first NF 200, upon having received the report in step S104 from the second NF 300, responds back to the second NF 300 with updated reporting instructions. Therefore, in some embodiments, the second NF 300 is configured to perform (optional) step S208:

S208: The second NF 300 obtains reporting instructions as updated for the session with the first NF 200.

The reporting instructions as updated might be obtained in the same way as the reporting instructions are obtained in step S202.

As disclosed above, in some embodiments, the reporting instructions are updated based on for which event the trigger condition was fulfilled and which values were provided in the report to the first NF 200.

Aspects of the first NF 200 and the second NF 300 will now be disclosed. In some embodiments, the first NF 200 is a service producer and the second NF 300 is a service consumer. Different combinations of NFs, interfaces, triggers, and cached IEs will be disclosed next.

According to a first example, the first NF 200 is a CHF, the second NF 300 is an SMF, and the interface is interface Nchf. The trigger conditions could then be any of: LOCATION_CHANGE, UE_TIMEZONE_CHANGE, RAT_CHANGE. The IEs whose values are cached by the first NF 200 for the session could then be any of: subscriberIdentifier, nfConsumerIdentification, notifyUri, serviceSpecificationInfo, chargingId, userInformation, uetimeZone, pduSessionID, sscMode, ratType.

According to a second example, the first NF 200 is a PCF, the second NF 300 is an AMF, and the interface is interface Npcf. The trigger conditions could then be any of: LOC_CH, UE_AMBR_CH, ACCESS_TYPE_CH. The IEs whose values are cached by the first NF 200 for the session could then be any of: notificationUri, altNotifFqdns, altNotifIpv6Addrs, altNotifIpv4Addrs, supi, gpsi, pei, userLoc, timeZone, ratType, servingPlmn, ueAmbr, guami, accessType.

According to a third example, the first NF 200 is an SMF, the second NF 300 is any of: NEF, AMF, AF, UDM, NWDAF, and the interface is interface Nsmf. The trigger conditions could then be any of: USER_PLANE_ACTIVATION, INTER_AMF_CHANGE, ACCESS_TYPE_CHANGE. The IEs whose values are cached by the first NF 200 for the session could then be any of: supi, pei, gpsi, groupId, pduSessionId, dnn, sNssai, subId, ratType, pcfId, selMode, servingNfId, apnRateStatus, anType, upCnxState, ueLocation, ueTimeZone.

Figure 4:
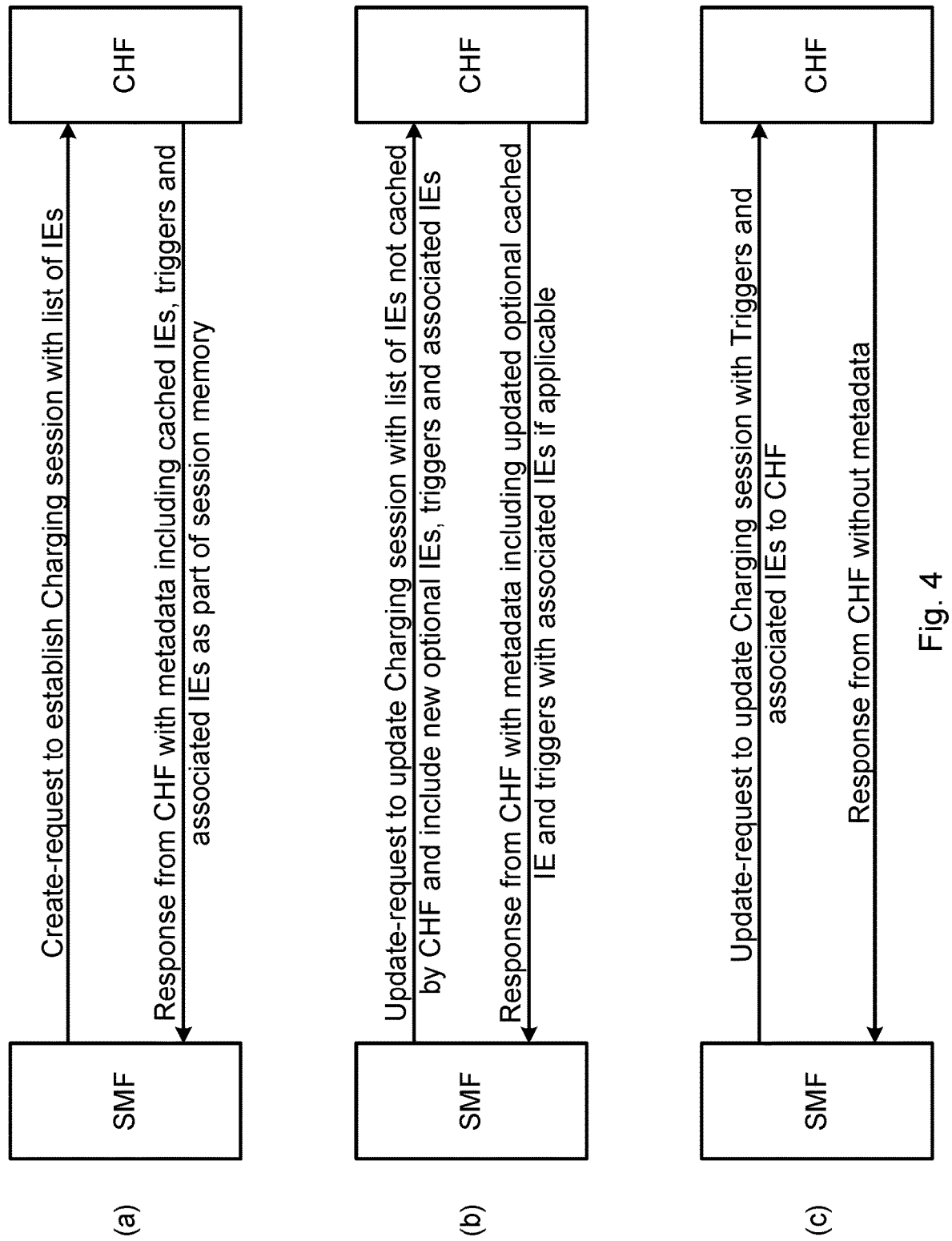
FIGS. 4 and 5 are signalling diagrams of methods according to embodiments.

Reference is now made to the signalling diagram of FIG. 4, where a CHF takes the role of the first NF 200 and an SMF takes the role of the second NF 300

In FIG. 4($a$), the SMF establishes a session with the CHF by sending a create request message. The create request message comprises a list of IEs. The CHF sends back a response message, where the response message reporting instructions as disclosed above. In the response message is thus included triggers and the IE, or IEs, expected for each trigger condition. The response also comprises optional IEs whose values will be cached by the CHF as part of session information.

In FIG. 4($b$), the SMF updates a session with the CHF by sending an update request message. The update request message comprises the values of IEs that the CHF does not cache, the cached IEs whose values have changed, and also values of new information elements, if applicable. In addition, the SMF includes only the values of the IEs associated with the particular trigger condition for which update request is triggered. The CHF responds back with another response message. This response message comprises a list of updated IEs whose values the CHF will cache as part of session information. If any change to previous data the CHF also includes in the response message triggers and the IE, or IEs, expected for each trigger condition.

In FIG. 4($c$), the SMF updates a session with the CHF by sending an update request message. The update request message comprises the values of IEs that the CHF does not cache, the IEs that are not associated with triggers and whose values have changed, and also values of the IEs associated with the trigger condition. The CHF responds back with another response message. If there are no changes to the cached IEs or the trigger and its associated IEs then the CHF will not include metadata as part of session information in the response message. If any change to previous data the CHF also includes in the response message triggers and the IE, or IEs, expected for each trigger condition.

Figure 5:
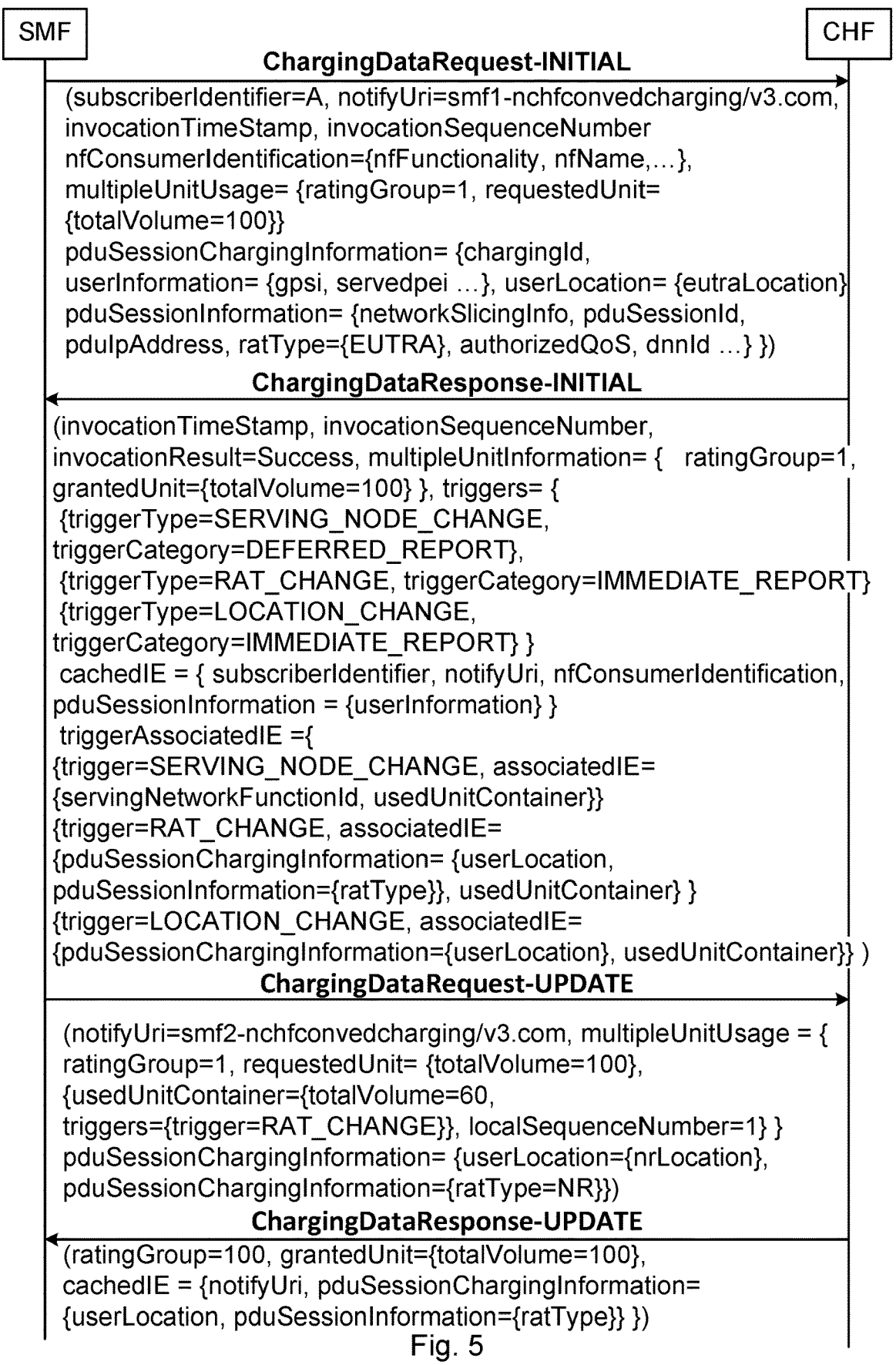

Reference is now made to the signalling diagram of FIG. 5.

In a ChargingDataRequest-INITIAL message, the SMF sends all the IEs applicable and available for a charging session requesting units from CHF for a specific rating group.

In a ChargingDataResponse-INITIAL message, the CHF authorizes the service usage and grants units to be consumed for that rating group. In addition, the CHF sends reporting instructions in terms of a list of IEs whose values are cached in the CHF to indicate to the SMF to not to send values of those IEs unless any of their values has changes. Moreover, the CHF sends reporting instructions in terms of a list of triggers and the associated IEs to be sent by the SMF when the relevant trigger event occurs for the triggers used by the CHF. In this example, triggers and its associated IEs are sent in the message in response, but to further optimize the response message size, triggers and their associated IEs can be published over a URL and the URL can be shared over a HTTP header or in the IE denoted triggerAssociatedIE.

In a ChargingDataRequest-UPDATE message, the SMF evaluates the IEs whose values have changed and sends only those IEs to the CHF. In the present example it is assumed that the value of the IE denoted notifyUri has been changed. In addition, the SMF also sends the only IEs which were tagged as associated IEs for the applicable trigger events.

In a ChargingDataResponse-UPDATE message, the CHF sends updated reporting instructions in terms of the newly cached IEs along with granted units for further service usage.

Figure 6:
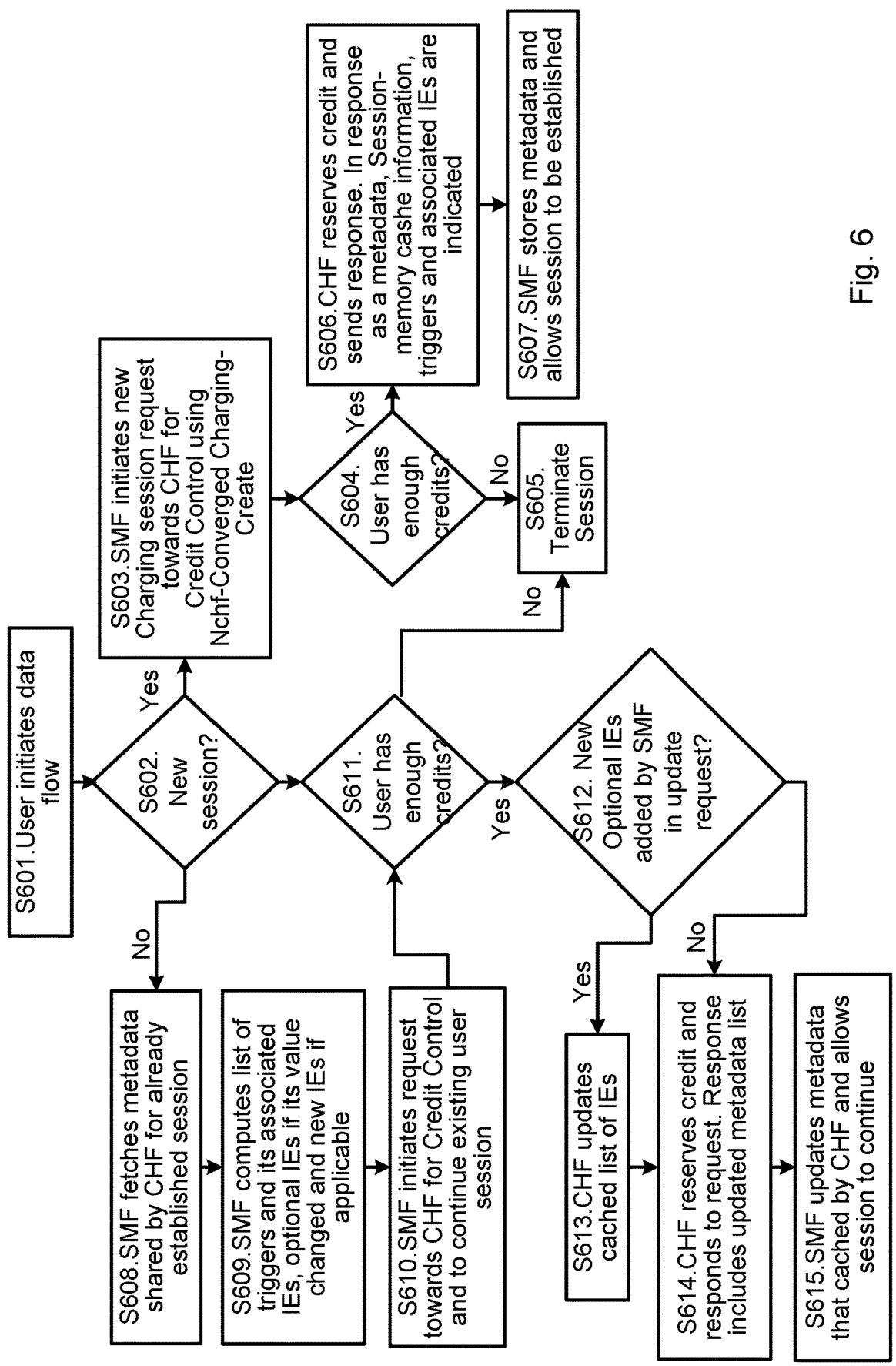

Reference is now made to the flowchart of FIG. 6. FIG. 6 shows how the SMF and the CHF could exchange information of cached values of IEs and also the IEs associated with a trigger.

If a data flow request is received from user (step S601), the SMF will check if this data flow request is a new session request or not (step S602). For a new session request, the SMF will initiate a session creation request towards the CHF (step S603). The CHF on receiving the request from the SMF will check if the user has enough credits (step S604). If the user has not enough credits, the session is terminated (step S605). If the user has enough credits, the CHF will reserve the units and respond to the SMF (step S606). In the response, the CHF includes the IEs that it will cache as part of the session. The CHF also includes a list of IEs associated with different triggers. The SMF on receiving the response from CHF for the session creation request stores the information about the IEs that the CHF caches (step S607). The SMF also stores information of the IEs associated with different triggers.

If the request received from the user is for continuing an established session, then the SMF fetches values of the cached IEs from earlier responses received from the CHF (step S608). The SMF also fetches the IEs associated with different triggers. The SMF computes the IEs whose values are changed compared to last request (step S609). The SMF also identities the IE associated with the trigger condition for which the update request is to be initiated. The SMF initiate a session continuation requests to the CHF by including new IEs (if applicable for the scenario), mandatory IEs, the IEs associated with the trigger for which update request is triggered and the optional IEs whose values were changed (step S610). The CHF on receiving the request from the SMF will check if the user has enough credits (step S611). If the user has not enough credits, the session is terminated (step S605). If the user has enough credits, the CHF will update the cache with the new values of the IEs received from the SMF (step S613). The cache is also updated with any new information elements (if they need to be cached) that is sent by SMF in the request (step S612 and step S614). The updated cached IEs along with other information is responded back to the SMF from the CHF. The SMF will then store the new list of cached IEs (step S615) and allows the session to continue.

Figure 7:
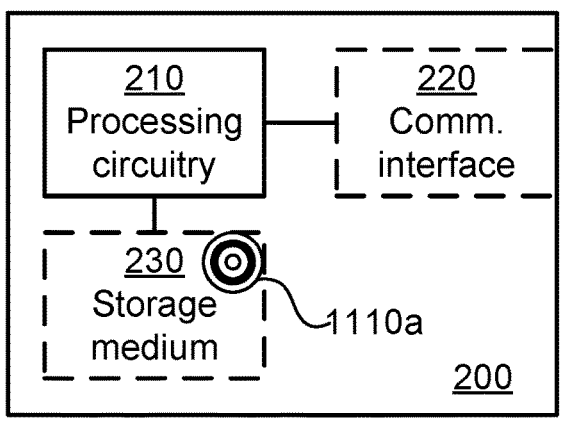
FIG. 7 is a schematic diagram showing functional units of a first NF according to an embodiment.

FIG. 7 schematically illustrates, in terms of a number of functional units, the components of a first NF 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110$a$ (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the first NF 200 to perform a set of operations, or steps, as disclosed above. For example, the storage medium 230 may store the set of operations, and the processing circuitry 210 may be configured to retrieve the set of operations from the storage medium 230 to cause the first NF 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The first NF 200 may further comprise a communications interface 220 for communications with other NFs of the SBA network 100. As such the communications interface 220 may comprise one or more transmitters and receivers, comprising analogue and digital components.

The processing circuitry 210 controls the general operation of the first NF 200 e.g. by sending data and control signals to the communications interface 220 and the storage medium 230, by receiving data and reports from the communications interface 220, and by retrieving data and instructions from the storage medium 230. Other components, as well as the related functionality, of the first NF 200 are omitted in order not to obscure the concepts presented herein.

Figure 8:
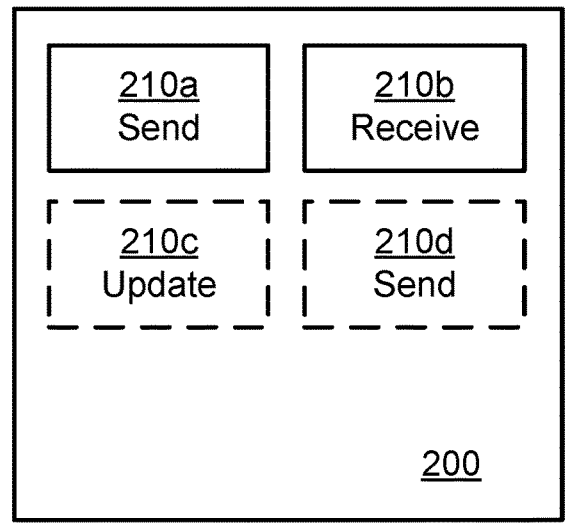
FIG. 8 is a schematic diagram showing functional modules of a first NF according to an embodiment.

FIG. 8 schematically illustrates, in terms of a number of functional modules, the components of a first NF 200 according to an embodiment. The first NF 200 of FIG. 8 comprises a number of functional modules; a send module 210a configured to perform step S102, and a receive module 210b configured to perform step S104. The first NF 200 of FIG. 8 may further comprise a number of optional functional modules, such as any of an update module 210c configured to perform step S106, and a send module 210d configured to perform step S108. In general terms, each functional module 210a:210d may be implemented in hardware or in software. Preferably, one or more or all functional modules 210a:210d may be implemented by the processing circuitry 210, possibly in cooperation with the communications interface 220 and/or the storage medium 230. The processing circuitry 210 may thus be arranged to from the storage medium 230 fetch instructions as provided by a functional module 210a:210d and to execute these instructions, thereby performing any steps of the first NF 200 as disclosed herein.

Figure 9:
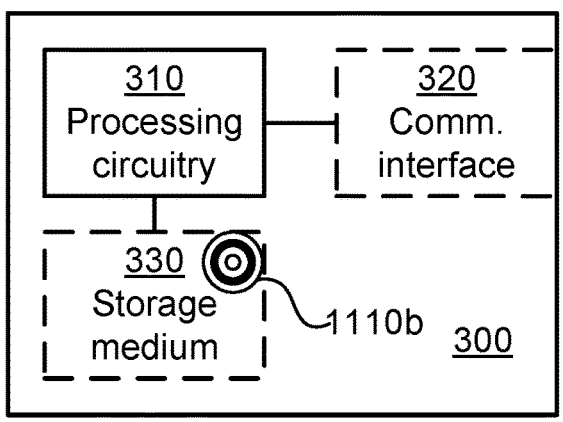
FIG. 9 is a schematic diagram showing functional units of a second NF according to an embodiment.

FIG. 9 schematically illustrates, in terms of a number of functional units, the components of a second NF 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the second NF 300 to perform a set of operations, or steps, as disclosed above. For example, the storage medium 330 may store the set of operations, and the processing circuitry 310 may be configured to retrieve the set of operations from the storage medium 330 to cause the second NF 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The second NF 300 may further comprise a communications interface 320 for communications with other NFs of the SBA network 100. As such the communications interface 320 may comprise one or more transmitters and receivers, comprising analogue and digital components.

The processing circuitry 310 controls the general operation of the second NF 300 e.g. by sending data and control signals to the communications interface 320 and the storage medium 330, by receiving data and reports from the communications interface 320, and by retrieving data and instructions from the storage medium 330. Other components, as well as the related functionality, of the second NF 300 are omitted in order not to obscure the concepts presented herein.

Figure 10:
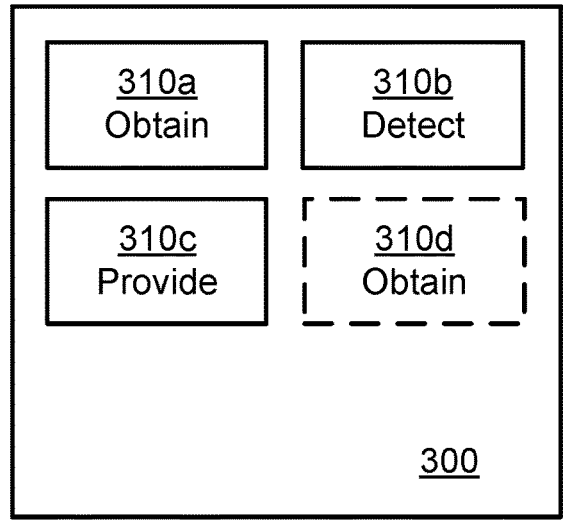
FIG. 10 is a schematic diagram showing functional modules of a second NF according to an embodiment.

FIG. 10 schematically illustrates, in terms of a number of functional modules, the components of a second NF 300 according to an embodiment. The second NF 300 of FIG. 10 comprises a number of functional modules; an obtain module 310a configured to perform step S202, a detect module 310b configured to perform step S204, and a provide module 310c configured to perform step S206. The second NF 300 of FIG. 10 may further comprise a number of optional functional modules, such as an obtain module 310d configured to perform step S208. In general terms, each functional module 310a:310d may be implemented in hardware or in software. Preferably, one or more or all functional modules 310a:310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a:310d and to execute these instructions, thereby performing any steps of the second NF 300 as disclosed herein.

A system comprises at least one first NF 200 and at least one second NF 300. Any of the first NF 200 and the second NF 300 may be provided as a respective standalone device or as a part of at least one further device. For example, the first NF 200 and the second NF 300 may be provided in a single node of the core network. Alternatively, functionality of the first NF 200 and the second NF 300 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the first NF 200 and the second NF 300 may be executed in a respective first device, and a second portion of the of the instructions performed by the first NF 200 and the second NF 300 may be executed in a respective second device; the herein disclosed embodiments are not limited to any particular number of devices on which the instructions performed by the first NF 200 and the second NF 300 may be executed. Hence, the methods according to the herein disclosed embodiments are suitable to be performed by a first NF 200 and a second NF 300 residing in a cloud computational environment. Therefore, although a single processing circuitry 210, 310 is illustrated in FIGS. 7 and 9 the processing circuitry 210, 310 may be distributed among a plurality of devices, or nodes. The same applies to the functional modules 210a:2109d, 310a:310d of FIGS. 8 and 10 and the computer programs 1120a, 1120b of FIG. 11.

Figure 11:
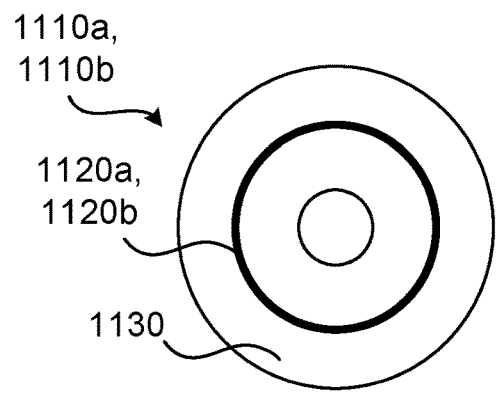
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the first NF 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the second NF 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for event-based reporting from a second network function (NF) to a first NF, the method being performed by the first NF, the method comprising:
    sending reporting instructions of events for a session with the second NF, wherein the reporting instructions comprise a list of triggers conditions for each of the events and information of Information Elements (IEs) whose values are cached by the first NF for the session, wherein each of the trigger conditions is associated with its own set of IEs, wherein the second NF is instructed to provide a report to the first NF when one of the trigger conditions is fulfilled at the second NF, the report comprising values of the set of IEs for the event that caused the trigger condition to be fulfilled, and wherein the second NF is instructed to include values in the report of those IEs cached by the first NF only if the values have changed compared to the cached values; and
    receiving the report of the event upon the trigger conditions having been fulfilled at the second NF.

2. The method of claim 1, wherein the reporting instructions comprises the cached values of the IEs whose values are cached by the first NF for the session.

3. The method of claim 1, wherein some of the IEs whose values are cached by the first NF for the session are not associated with any of the trigger conditions.

4. The method of claim 1, wherein the reporting instructions are sent to the second NF during initial message exchange of the session with the second NF.

5. The method of claim 1, wherein the reporting instructions are sent to the second NF during the session upon any of the trigger conditions having been updated during the session.

6. The method of claim 1, wherein the reporting instructions are published as a web resource, and wherein the reporting instructions are sent as a Uniform Resource Locator, URL, pointing to the web resource.

7. The method of claim 6, wherein the URL is provided in a Hypertext Transfer Protocol, HTTP, header.

8. The method of claim 1, wherein the method further comprises:
    updating the reporting instructions upon having received the report; and
    sending the reporting instructions as updated for the session with the second NF.

9. The method of claim 8, wherein the reporting instructions are updated based on for which event the trigger condition was fulfilled and which values were received in the report from the second NF.

10. A method for event-based reporting from a second network function (NF) to a first NF, the method being performed by the second NF, the method comprising:
    obtaining reporting instructions of events for a session with the first NF, wherein the reporting instructions comprise a list of triggers conditions for each of the events and information of Information Elements (IEs) whose values are cached by the first NF for the session, wherein each of the trigger conditions is associated with its own set of IEs, wherein the second NF is instructed to provide a report to the first NF when one of the trigger conditions is fulfilled at the second NF, the report comprising values of the set of IEs for the event that caused the trigger condition to be fulfilled, and wherein the second NF is instructed to include values in the report of those IEs cached by the first NF only if the values have changed compared to the cached values;
    detecting occurrence of one of the events which causes at least one of the trigger conditions to be fulfilled at the second NF; and as a result thereof:
    providing the report of the detected event in accordance with the reporting instructions.

11. The method of claim 10, wherein the reporting instructions comprises the cached values of the IEs whose values are cached by the first NF for the session.

12. The method of claim 10, wherein some of the IEs whose values are cached by the first NF for the session are not associated with any of the trigger conditions.

13. The method of claim 10, wherein the reporting instructions are obtained from the first NF during initial message exchange of the session with the first NF.

14. The method of claim 10, wherein the reporting instructions are obtained from the first NF during the session upon any of the trigger conditions having been updated during the session.

15. The method of claim 10, wherein the reporting instructions are published as a web resource, and wherein the reporting instructions are obtained as a Uniform Resource Locator, URL, pointing to the web resource.

16. The method of claim 15, wherein the URL is provided in a Hypertext Transfer Protocol, HTTP, header.

17. The method of claim 10, wherein the method further comprises: obtaining reporting instructions as updated for the session with the first NF.

18. The method of claim 17, wherein the reporting instructions are updated based on for which event the trigger condition was fulfilled and which values were provided in the report to the first NF.

19. A first network function (NF) for event-based reporting from a second NF to the first NF, the first NF comprising processing circuitry, the processing circuitry being configured to cause the first NF to:
 send reporting instructions of events for a session with the second NF, wherein the reporting instructions comprise a list of triggers conditions for each of the events and information of Information Elements (IEs) whose values are cached by the first NF for the session, wherein each of the trigger conditions is associated with its own set of IEs, wherein the second NF is instructed to provide a report to the first NF when one of the trigger conditions is fulfilled at the second NF, the report comprising values of the set of IEs for the event that caused the trigger condition to be fulfilled, and wherein the second NF is instructed to include values in the report of those IEs cached by the first NF only if the values have changed compared to the cached values; and
 receive the report of the event upon the trigger conditions having been fulfilled at the second NF.

20. A second network function (NF) for event-based reporting from the second NF to a first NF, the second NF comprising processing circuitry, the processing circuitry being configured to cause the second NF to:
 obtain reporting instructions of events for a session with the first NF, wherein the reporting instructions comprise a list of triggers conditions for each of the events and information of Information Elements (IEs) whose values are cached by the first NF for the session, wherein each of the trigger conditions is associated with its own set of IEs, wherein the second NF is instructed to provide a report to the first NF when one of the trigger conditions is fulfilled at the second NF, the report comprising values of the set of IEs for the event that caused the trigger condition to be fulfilled, and wherein the second NF is instructed to include values in the report of those IEs cached by the first NF only if the values have changed compared to the cached values;
 detect occurrence of one of the events which causes at least one of the trigger conditions to be fulfilled at the second NF; and as a result thereof:
 provide the report of the detected event in accordance with the reporting instructions.

* * * * *